United States Patent [19]
Stipp

[11] 4,335,149
[45] Jun. 15, 1982

[54] DIRECT CONDENSATION OF FOOD VOLATILES ONTO A FOOD SUBSTRATE AT CRYOGENIC TEMPERATURES

[75] Inventor: Gordon K. Stipp, West Chester, Ohio

[73] Assignee: The Procter & Gamble Company, Cincinnati, Ohio

[21] Appl. No.: 155,709

[22] Filed: Jun. 2, 1980

[51] Int. Cl.³ .................... A23F 5/24

[52] U.S. Cl. .................... 426/386; 426/312; 426/594

[58] Field of Search .............. 426/594, 595, 386, 388, 426/312, 319, 453, 524; 366/106, 101; 34/57 A, 5; 62/57

[56] References Cited

U.S. PATENT DOCUMENTS

| | | | |
|---|---|---|---|
| 2,738,276 | 3/1956 | Blench | 426/386 |
| 3,143,428 | 8/1964 | Reimers et al. | 426/453 |
| 3,436,837 | 4/1969 | Abelow et al. | 34/57 A |
| 3,615,669 | 10/1971 | Hair et al. | 426/453 |
| 3,823,241 | 7/1974 | Patel et al. | 426/386 |

*Primary Examiner*—Raymond N. Jones
*Assistant Examiner*—George C. Yeung
*Attorney, Agent, or Firm*—Eric W. Guttag; Michael J. Roth; Richard C. Witte

[57] ABSTRACT

A method for the direct condensation of gaseous food volatiles, such as coffee aroma, on a food substrate, such as coffee, at cryogenic temperatures. A bed of particulated solid substrate is placed in a vessel cooled by a cryogenic fluid such as liquid nitrogen. The substrate is fluidized to provide an adsorbent bed thereof. Gaseous aroma volatiles are then adsorbed onto the cooled and fluidized bed of substrate having a temperature preferably below −150° F. The aromatized substrate formed is preferably equilibrated to insure uniformity of aromatization, binding of volatiles to the substrate and storage stability. The resultant aromatized substrate can then be added to unaromatized food material for aroma and/or flavor enhancement.

19 Claims, No Drawings

DIRECT CONDENSATION OF FOOD VOLATILES ONTO A FOOD SUBSTRATE AT CRYOGENIC TEMPERATURES

TECHNICAL FIELD

The present application relates to the field of aromatization of food materials, in particular, coffee.

BACKGROUND ART

A frequent problem in food processing is the loss of aroma and/or flavor volatiles. In the case of coffee, these volatiles can be lost at a number of points in the processing. One point is when the coffee beans are roasted. See U.S. Pat. No. 2,087,602 to McCrosson, Issued July 20, 1937, which discloses a process for enriching the aroma and flavor of coffee by drenching roast and ground coffee with aroma-laden gases liberated during green bean roasting in a sealed coffee roaster. Roasting produces gaseous aromas which are generally harsh and unpleasant-smelling but can be fractionated to recover useful aroma volatiles. See U.S. Pat. No. 2,156,212 to Wendt et al, issued Apr. 25, 1939, which discloses a process wherein vapors from roaster gases are collected and purified and then contacted with liquid coffee concentrate, coffee powder or roast and ground coffee.

Another point where aroma volatiles are lost is during the grinding of the roasted beans. Although grinding is necessary to liberate solubles for extraction, a substantial portion (about 50%) of the aroma volatiles are frequently lost. See U.S. Pat. No. 2,306,061 to Johnston, issued Dec. 12, 1942, wherein compounds or vapors released during grinding of roasted coffee are brought into contact with coffee or beverage extract, e.g. soluble coffee, in a vessel cooled to −70° C. (−94° F.) to −15° C. (−20° F.) by dry ice or brine.

Another point where aroma volatiles can be lost is during milling of coffee to produce flaked coffee. Although flaked coffee has increased extractability, the aroma intensity of the coffee is much less than that of roast and ground coffee due to loss of aroma volatiles (about 75% of total available) liberated during milling. See U.S. Pat. No. 3,615,667 to Joffe, issued Oct. 26, 1971, wherein flaked low and intermediate grade coffees which are poor in aroma quality are combined with high grade coffees having good aroma qualities.

Two principal methods are used to correct the problem of aroma volatile loss in coffee processing. The first method involves low temperature grinding to prevent excessive release of aroma volatiles. One example is the grinding of roasted coffee beans in the presence of liquid nitrogen. See British Patent Document No. 1,424,264 to Strobel, published Feb. 11, 1976. Another example is the co-grinding of coffee beans with dry ice. See U.S. Pat. No. 3,725,076 to Stefanucci et al, issued Apr. 3, 1973.

Low temperature grinding to prevent excessive release of aroma volatiles has a number of disadvantages. In the case of liquid nitrogen grinding, special equipment is necessary, adding to the expense of the processing. Also, the aroma character of the volatiles produced during low temperature grinding can be significantly different from aroma volatiles produced by grinding at ambient temperatures. Further, there is a practical limit to the amount of volatiles which can be retained.

The other principal method for dealing with the problem of the loss of aroma volatiles is by recovery thereof on an aroma substrate. One example is direct condensation of gaseous volatiles on a chilled aroma substrate, as suggested by the Johnson patent. Typically, cryogenic temperatures (below −150° F.) are employed. See U.S. application Ser. No. 957,384 to Edmund P. Pultinas, filed Nov. 3, 1978, commonly assigned, which discloses a method for forming highly aromatized coffee products by adsorbing grinder gas onto a packed column of coffee cooled by liquid nitrogen. See also U.S. Pat. No. 3,823,241 to Patel et al, issued July 9, 1974, wherein an absorbent carrier is cooled to at least −40° F. (preferably −150° F.) and then placed in communication with roast and ground coffee under pressure conditions which transfer the coffee aroma to the absorbent carrier. Another example is aroma frost equilibration with an aroma substrate which is typically a liquid glyceride such as coffee oil. See U.S. Pat. No. 3,783,163 to Patel, issued Jan. 1, 1974, which discloses a method for aromatizing edible oils by adding the oil to a cryogenic fluid to form a slurry, adding an aroma frost to the slurry, preferably with mixing, and then allowing the mixture to equilibrate to evaporate the cryogenic fluid, leaving behind a residue of aroma-enhanced oil.

The use of liquid nitrogen for volatile recovery, as in the case of liquid nitrogen grinding, results in high capital and operational cost for large-scale processes because of the heat transfer limitations of conventional liquid nitrogen processing. For example, in the case of aroma frost equilibration with coffee, the standard equipment for forming the aroma frost is a scrapped-wall heat exchanger. The wall of the exchanger generally serves as a heat transfer barrier, thus necessitating liquid nitrogen as the coolant to offset this heat transfer problem. Even where liquid nitrogen is used, significant heat transfer limitations can remain. For example, in the case of direct condensation of gaseous aroma volatiles onto a packed column of coffee, thermal gradients are created because of low effective bed thermal conductivity of the packed column which result in non-uniform adsorption of the volatiles onto the coffee.

Further, the low temperatures created by liquid nitrogen processing tend to magnify the heat transfer problems. The volatile stream used in direct condensation or aroma frost formulation usually contains predominant amounts of other compounds. For example, a grinder gas stream of coffee aroma normally contains 85% air, 3% water, 12% $CO_2$ and only 0.1% aroma volatiles. These other compounds can condense at liquid nitrogen temperatures, thus creating an additional sensible heat load which necessitates the use of more liquid nitrogen at an additional cost.

A suitable method for direct condensation of food volatiles on a solid food substrate is described in a U.S. patent application to Gordon K. Stipp and Hing C. Tse, Ser. No. 088,249, filed Oct. 25, 1979, now abandoned, entitled "Method for the Collection of Aroma Volatiles Onto a Food Aroma Substrate", commonly assigned. A particulate mixture of solid coolant such as dry ice and food substrate such as coffee is rapidly agitated while in contact with food volatiles, preferably coffee aroma, which adsorb onto the mixture. The coolant is then vaporized to provide an aromatized food product. This process enables direct absorption of coffee aroma on a solid coffee substrate at significantly higher temperatures, e.g. −110° F. to −80° F. where dry ice is the solid coolant, than are possible with liquid nitrogen processing because of improved heat transfer characteristics.

The process described in the Stipp et al application is an economical and efficient method for direct condensation of volatiles on a solid food substrate. However, this process does have a couple of requirements which can create some inflexibility. The number of commercially available solid coolants is limited. Also, the solid coolant must be vaporized or removed from the aromatized solid food substrate which can lead to volatile stripping. Further, where dry ice is employed as the coolant, a sharp aroma is imparted to the substrate which may be undesirable for some food materials. In addition, lower, e.g. liquid nitrogen, temperatures are sometimes necessary for maintaining the aroma profile of certain volatile mixtures. Commercially practical methods for direct condensation of gaseous volatiles, especially coffee aroma, on a solid aroma substrate, especially solid, particulated coffee oil, at cryogenic temperatures are still needed.

It is therefore an object of the present invention to provide a process for direct condensation of gaseous volatiles on a solid food substrate at cryogenic temperatures which has improved heat transfer characteristics during condensation/adsorption of the volatiles on the substrate.

It is a further object of the present invention to provide a process for direct condensation of gaseous volatiles on a solid food substrate at cryogenic temperatures which is efficient and economical.

It is yet a further object of the present invention to provide a process for direct condensation of gaseous volatiles on a solid food substrate at cryogenic temperatures which is commercially practical.

It is yet another object of the present invention to provide a process for direct condensation of gaseous aroma on a solid food substrate at cryogenic temperatures which results in an aromatized product having good fidelity aroma.

These and further objects of the present invention are disclosed hereafter.

DISCLOSURE OF THE INVENTION

A. Summary of the Invention

The present invention relates to a novel method for direct condensation of food volatiles, in particular, coffee volatiles, on a food substrate, in particular, a coffee substrate at cryogenic, e.g. liquid nitrogen, temperatures. A particulated solid food substrate is placed in a vessel. The vessel is cooled with a cryogenic fluid. The food substrate is then fluidized to provide an adsorbent bed thereof. The fluidized, cooled bed of substrate which has a bed temperature below about −100° F., preferably below about −150° F., is contacted with gaseous food volatiles to condense and adsorb the volatiles thereon.

The process of the present invention significantly improves heat transfer from the bed of substrate during condensation/adsorption of the volatiles. By promoting heat transfer from the bed of substrate, the volatiles adsorb more readily and uniformly onto the substrate compared to prior art liquid nitrogen recovery techniques. Further, the process of the present invention is more practical and economical for volatiles recovery than prior art liquid nitrogen recovery techniques. Yet, the process of the present invention provides aromatized substrates having good fidelity aroma.

U.S. Pat. No. 3,823,241 to Patel et al, issued July 9, 1974, does disclose a method for direct condensation of gaseous coffee aroma on a substrate such as coffee oil sprayed on instant coffee or cryofied, particulated coffee oil wherein the substrate can be "continuously agitated". However, it has been found that not all forms of agitation will work. The bed of food substrate must be fluidized, e.g. rapidly agitated, to improve heat transfer rates during condensation/adsorption of the volatiles so that the volatiles adsorb faster and more uniformly on the substrate. The faster, more uniform adsorption of the volatiles makes the process of the present invention more commercially practical for volatiles recovery than prior art liquid nitrogen processing.

B. Food Substrates

A variety of food substrates can be used in the process of the present invention. The general requirements are that the substrate be in solid form and exist either naturally, or by size reduction, as discrete units or particles. Generally, volatiles transfer to the substrate material is increased by decreasing the particle size thereof. Also, materials which contain edible oils, either naturally or by addition, adsorb greater amounts of volatiles. However, it is to be understood that excessive amounts of added oil can adversely affect subsequent volatile release. Further, substrate materials which are porous tend to retain the volatiles more effectively.

Materials which can be employed as food substrates include a variety of vegetables and fruits and combinations thereof, such as nuts, peanuts, cereals, and tea, or processed food materials such as meat analog (derived from soy or other vegetable proteins). Also, edible oils of the animal or vegetable fat variety such as soybean oil, rapeseed oil, cottonseed oil, marine or animal fats, and oils extracted from fruits can be employed. The edible oil must be solidified and particulated when forming the bed of food substrate.

The process of the present invention is particularly useful for coffee substrate materials, both decaffeinated and undecaffeinated varieties. These coffee materials can include roast and ground coffee, flaked coffee, instant (soluble) coffee, expeller cake, as well as roasted grains, such as sprouted barley, rye, corn and chicory, or combinations of different coffee substrates with these roasted grains. Also, coffee substrates comprising edible oils, i.e. an edible oil alone or an edible oil sprayed onto another coffee aroma substrate, can be employed in the process of the present invention. Coffee oil, alone or in combination with an additional coffee substrate, as well as roast and ground and flake coffee, are preferred. The method of the present invention is particularly directed at the aromatization of solid particulated edible oils, especially coffee oil.

Roast and ground coffee can be made by methods well known in the art. See, for example, "Coffee Processing Technology", Sivetz & Foote, The Avi Publishing Co., Westport, Connecticut, 1963, Vol. I, pp. 203–239, for an illustration of grinding techniques. A variety of roast and ground coffee blends, including those which may be classified for convenience and simplification as low-grade, intermediate grade, and high-grade coffees can be used. Suitable examples of low-grade coffees include the natural Robustas such as the Ivory Coast Robustas and Angola Robustas, and the natural Arabicas such as the natural Perus and natural Ecuadors. Suitable intermediate-grade coffees include the natural Arabicas from Brazil such as Santos, Paranas and Minas, and natural Arabicas such as Ethiopians.

Examples of high-grade coffees include the washed Arabicas such as Mexicans, Costa Ricans, Colombians, Kenyas and New Guineas. Other examples and blends thereof are known in the art and illustrated in, for example, U.S. Pat. No. 3,615,667 to Joffe, issued Oct. 26, 1971 and incorporated herein by reference.

Roast and ground coffee which has been transformed into flaked coffee by roll milling roast and ground coffee is known in the art. Processes for preparing flaked coffee are disclosed in U.S. Pat. No. 3,615,667 to Joffe, issued Oct. 26, 1971, and in U.S. Pat. No. 3,660,106, to McSwiggin et al, issued May 2, 1972, incorporated herein by reference.

C. Food Volatiles

A variety of food volatiles (aroma and/or flavor volatiles) derived from numerous sources can be employed in the process of the present invention. The general requirement of the volatiles is that they be gaseous when brought into contact with the food substrate. The volatiles can be derived from a variety of vegetables and fruits such as roasted beans, nuts, oranges and the like. Also, volatiles of a synthetic variety can be used in the process of the present invention. If desirable, volatiles from one food source can be adsorbed onto a food substrate from a different food source. In the case of coffee volatiles, those which are gaseous below 350° F. are preferred.

The food volatiles preferably adsorbed onto the substrate are coffee volatiles. These coffee volatiles can be derived from a variety of sources. For example, with regard to roast and ground coffee processing, volatiles can be obtained from gases evolved during roasting, grinding, flaking, bulk handling and other processing steps. With regard to instant coffee processing, volatiles can be obtained during dry distillation or steam distillation of roast and ground coffee beans, such as Desorbate volatiles obtained from the process described in U.S. Pat. No. 3,717,472, issued Feb. 20, 1973, and No. 3,997,685, issued Dec. 14, 1976 to Strobel, and U.S. Pat. No. 4,100,305, issued to Gregg, July 11, 1978, or from extraction stripping condensate, stripped coffee oil and/or similar sources.

A preferred source of coffee volatiles is grinder gas. As used in the present application, the term "grinder gas" is defined as those aroma and flavor volatiles liberated during and after the grinding of the roasted coffee beans. Preferentially, the grinder gas is that gas drawn directly from the grinder but can include gas from such sources as flaking mills and coffee bins. This gas is preferred because it contains the richest and most intense source of those aroma and flavor constituents perceived by the user as most desirable. Also, the utilization of this gas represents the recovery of material normally lost during conventional roast and ground coffee processing.

D. Coolant

The coolant used in the process of the present invention is a cryogenic fluid. As used herein, the term "cryogenic fluid" refers to those liquids having low temperature boiling points, i.e. below −150° F., and typically on the order of about −300° F. Suitable cryogenic fluids which can be used in the process of the present invention include liquid nitrogen (b.p. −320° F.), liquid oxygen (b.p. −297° F.), liquid air (b.p. −314° F.), and the like. From the standpoint of commercial availability, the preferred cryogenic fluid is liquid nitrogen.

E. Description of Process

1. Cryofication of Substrate and Vessel Cooling

It is a preferable preliminary step in the process of the present invention to precool the substrate with a cryogenic fluid. For example, the substrate can be added directly to the cryogenic fluid, preferably liquid nitrogen, in a process called "cryofication". Cryofication is a particularly preferable method for forming particulated edible oil substrates because the cryogenic fluid fractures the oil into very small particles (preferably 500 microns in size or less) providing a large surface area and a porous structure in the particles which increases the adsorption of the volatiles. See U.S. Pat. No. 3,783,163 to Patel, issued Jan. 1, 1974, Col. 3, lines 10–27, herein incorporated by reference, which describes a process for cryofication of an edible oil such as coffee oil. Other methods for cryofying the substrate include grinding in the presence of a cryogenic fluid and co-spraying the substrate with a cryogenic fluid.

The vessel in which the volatiles are condensed/adsorbed onto the food substrate is cooled by a cryogenic fluid. Preferably, the vessel is insulated as much as possible from the surrounding environment to minimize intrusion of heat. Typically, the cryogenic fluid is circulated through the jacket of the vessel to provide the cooling. Generally, high flow rates of coolant and cooling of as much of the vessel surface area as possible are desirable to maintain the average temperature of the bed of substrate inside the vessel below about −100° F. and preferably below about −150° F. Further, greater interior vessel surface area to substrate volume ratios are preferred.

2. Fluidized beds

It is important to the process of the present invention that the food substrate be fluidized to provide an absorbent bed thereof. A fluidized bed of substrate is necessary to maintain a more uniform bed temperature, to permit a greater heat dissipation rate during condensation/adsorption of the volatiles onto the substrate and to promote faster adsorption of volatiles onto the substrate. The term "fluidization" refers to a process where fine, solid particles are made to behave in a fluid-like manner. A dense phase fluidized bed, such as a bed of particulated solid food substrate, behaves much like that of a boiling liquid. Fluidization normally takes place when the force of the fluidizing gas exceeds the weight and friction factors within the bed of solid particles. For example, gaseous volatiles can be passed upwardly through the food substrate at a velocity sufficient to cause a fluidized bed thereof. Fluidization by passing a flow of gaseous volatiles through the food substrate is referred to hereinafter as "gaseous fluidization". For a gaseous fluidization system, fluidization velocities of about 2 to 5 ft./sec. are usually sufficient to provide the desired fluidized bed of substrate, e.g. roast and ground coffee. See *Perry's Chemical Engineer's Handbook* (4th ed. 1963), pp. 20–64 to 20–74 for a further description of fluidized beds.

The type of fluidized bed employed in the process of the present invention can best be defined in terms of "bed porosity". Factors which go into defining bed porosity are the volume of the bed of food substrate, the density of the substrate, and the amount of substrate which is fluidized. A relationship which can be used to define bed porosity is:

$$E = \frac{V_B - (M_s/D_s)}{V_B}$$

where E is the bed porosity, $V_B$ is the total volume occupied by the bed of substrate, $M_S$ is the amount of substrate in the bed and $D_S$ is the density of the substrate. The relationship $V_B-(M_S/D_S)$ defines the amount of void space in the bed. Other relationships for defining bed porosity can be developed based on volume expansion of the bed of substrate during fluidization. For example, the following relationship can be employed:

$$E_F = \frac{V_N + V_I - E_N V_N}{V_N + V_I}$$

where $E_F$ is the bed porosity of the fluidized (expanded) bed, $V_N$ is the volume of the nonexpanded or nonfluidized bed, $V_I$ is the volume increase on going from a nonexpanded to a fluidized bed, and $E_N$ is the bed porosity of the nonexpanded bed of substrate. The value for $E_N$ can readily be determined for a given food substrate in a particular system when the bed is nonexpanded. Because bed porosity can change significantly during the condensation/adsorption of the volatiles, the bed porosity values referred to in the present application are normally determined prior to the condensation/adsorption step.

It has been found that a bed porosity value of from about 0.11 to 0.55 represents a nonexpanded or nonfluidized system for solid coffee substrates, especially roast and ground coffee and particulated coffee oil. A bed porosity of at least about 0.73 has normally been found sufficient to provide an adequate fluidized bed of substrate for the process of the present invention. Preferably, the bed porosity value is at least about 0.81 to provide uniformly low temperatures in the bed of substrate. The maximum bed porosity is generally determined by the size and geometry of the vessel where fluidization takes place, the fluidization conditions and by the desire to avoid bubble formation in the bed which can lead to undesirable thermal gradients and nonuniform condensation/adsorption of the volatiles onto the substrate.

3. Mechanical Fluidization

As indicated above, gaseous fluidization can be employed in the process of the present invention. A preferred method for fluidizing the food substrate is mechanical fluidization, i.e. rapid agitation with a mechanical mixing system to provide the fluidized bed of substrate. In mechanical fluidization, the substrate is continuously hurled and whirled so as to create the fluidized system normally formed by gaseous fluidization. If desirable, combinations of both mechanical and gaseous fluidization can be employed in the process of the present invention.

To achieve mechanical fluidization in the process of the present invention, certain types of mixers are usually needed. For example, one suitable mixer employs an impeller in the form of a centrally rotating shaft having a plurality of radially extending arms attached thereto. Crescent-shaped scoops are attached to the ends of the arms. See U.S. Pat. No. 3,273,863 to Lodige et al, issued Sept. 20, 1966 which discloses a mixer employing an impeller having such crescent-shaped scoops. Another suitable mixer employs an impeller which has scoops in the form of a double-bladed plow. See U.S. Pat. No. 3,018,059, issued Jan. 23, 1962, No. 3,027,102, issued Mar. 27. 1962, and No. 3,162,428, issued Dec. 22, 1964 to Lodige et al, which disclose mixing devices employing impellers having double-bladed plow-shaped scoops.

Important factors in providing the desired bed porosities for a mechanically fluidized bed of substrate in a given mixer are the tip speed of the impeller, i.e. the speed of the scoop, and the amount of substrate to be fluidized. For example, in the case of drip grind size roast and ground coffee, a bed porosity of 0.91 is achievable where the amount of coffee fluidized is 60 lbs. in a 300 lb. capacity mixer and the tip speed is 251 ft./min. By contrast, a bed porosity of 0.74 is achievable where the amount of roast and ground coffee is 180 lbs. and the tip speed is 314 ft./min. Generally, lower bed temperatures and better heat transfer characteristics are created as the tip speed of the mixer increases.

Typically, the mixer can be from about 20% to 60% full of food substrate.

4. Condensation and adsorption of the volatiles onto the fluidized bed of substrate While the bed of food substrate is in a cooled and fluidized state, the food volatiles are brought into contact therewith. It is usually desirable to remove any moisture from the volatiles prior to contact with the substrate to remove undesirable heat loads and to minimize plugging, i.e. ice freeze-up, of the fluidized bed of substrate. The bed of substrate can be aromatized, i.e. aromatized with aroma and/or flavor volatiles, either in a batch-wise fashion or by a continuous method. The amount of contact time between the volatiles and the bed of food substrate depends on a variety of factors, including the amount of aromatization desired, the temperature of the bed, the type of substrate aromatized, etc. Generally, the length of contact time is preferably maximized to assure greater adsorption of the volatiles on the bed of substrate. If desirable, volatiles which are not adsorbed can be recycled back to the bed of substrate.

The gas loading (flow) rate of the volatiles through the fluidized bed of food substrate can be very important with regard to bed temperature and heat transfer characteristics thereof. Generally, it is desirable to maximize the gas loading rate of the volatiles through the bed of substrate to promote lower bed temperatures and greater heat transfer rates during condensation/adsorption of the volatiles on the substrate. For a mechanical fluidization system, a gas loading rate of at least about 200 $ft.^3$ of volatiles per hour per $ft.^3$ of substrate is usually sufficient for the process of the present invention where the tip speed of the mixer is at least about 200 ft./min. For bed temperatures of from about $-200°$ to $-300°$ F., a gas loading rate of about 500 to 2000 $ft.^3$ of volatiles per hour per $ft.^3$ of substrate is usually preferred where the tip speed of the mixer is from about 400 to 1000 ft./min.

Although the volatiles can be brought into contact with the bed of food substrate at atmospheric pressure, pressurization and concentration of the volatiles can also be employed without degradation thereof. The volatiles can be pressurized up to about 100 psig or higher. Pressurization of the volatiles promotes adsorption of the volatiles onto the bed of food substrate. Also, because volatile transfer is promoted, pressurization of the volatiles can reduce cryogenic fluid usage, as well as increase the volatile processing capacity.

If desirable, the contacting step can be conducted under a vacuum. For example, the vacuum can be drawn on the vessel so as to pull the volatiles through the bed of food substrate.

5. Equilibration of Aromatized Substrate

An optional preferable step after the volatile contacting step is equilibration. The equilibration step insures greater uniformity of aromatization of the food substrate. A variety of methods can be employed to equilibrate the aromatized food substrate. Generally, equilibration is conducted under conditions which promote uniformity of volatile adsorption on the food substrate but do not promote volatile stripping. If desirable, additional unaromatized food substrate in solid or liquid form can be added to the aromatized food substrate before the equilibration step.

Two particular methods have been developed for the equilibration of coffee substrates aromatized with grinder gas volatiles. In one method, the volatile/substrate matrix is allowed to equilibrate at temperatures above the vaporization point of $CO_2$ for at least a period of time sufficient to evaporate the $CO_2$ and leave behind a substrate enriched with volatiles. No special criticality is associated with the precise temperature employed as long as the temperature is above the vaporization point of $CO_2$. Temperatures up to ambient can be used, although temperatures of from about −100° F. to about 0° F. are preferred. During the vaporization step, all undesired gases which are present can be removed, such as nitrogen, air, excess $CO_2$, etc. Preferably, 4 to 8 days are allowed for equilibration to permit maximum uniformity of aromatization on the substrate. After equilibration, the volatile-enriched substrate can be packed, or added to an unaromatized product, e.g. instant or roast and ground coffee, to yield aroma and/or flavor enhancement for the unaromatized product and then packed.

An alternative method is pressure fixation where the volatile/substrate matrix is added to a pressure vessel. See U.S. Pat. No. 3,939,291 to Katz, issued Feb. 17, 1976; U.S. Pat. No. 3,979,528 to Mahlmann, issued Sept. 7, 1976, U.S. Pat. No. 4,007,291 to Siedlecki et al, issued Feb. 8, 1977, which describe pressure fixation techniques for coffee aroma frost on liquid glycerides. The contents of the vessel are gently heated by circulating a moderate heating medium (e.g. 75° to 175° F. hot process water) through the jacket of the vessel and agitated until the internal pressure is between 10 and 300 psig. Excess $CO_2$ is volatilized by both the agitation and heating process. Isobaric expansion of excess $CO_2$ in the venting process removes heat from the vessel contents, thus maintaining the internal temperature sufficiently low to minimize thermal degradation of the volatiles. After the excess $CO_2$ has been vented, the vessel contents can be packed or added to unaromatized product to enhance the aroma and/or flavor thereof and then packed.

In an optional method according to the present invention, the entire aromatization process can be conducted in a pressure vessel cooled with a cryogenic fluid. For example, solid particulated coffee substrate is added to the pressure vessel provided with a mechanical mixer. Coffee volatiles under pressure are continuously fed into the vessel. Generally, pressures up to 1200 psig or higher can be employed (at 75 psig, the critical point of $CO_2$, the $CO_2$ is generally present as a solid; at pressures of from about 75 psig to 1200 psig, the $CO_2$ is present as a solid/liquid/vapor mixture; at pressures above 1200 psig, the $CO_2$ is generally present as a gas). The substrate is rapidly agitated within the vessel to provide a fluidized bed thereof. After a period of time sufficient to allow adsorption of the coffee volatiles onto the bed, the excess $CO_2$ can be vented as in the foregoing described pressure fixation technique.

6. Advantages of the Process of the Present Invention over the Prior Art

The process of the present invention has a number of advantages over conventional liquid nitrogen processing for volatile recovery. Because the bed of food substrate is fluidized during the contacting step, the process of the present invention tends to be better in dissipating sensible and condensation/adsorption heat loads. The process of the present invention also tends to promote the uniformity of volatile adsorption onto the food substrate. As indicated previously, a packed bed of coffee cooled by liquid nitrogen has numerous thermal gradients which result in non-uniform coating and thus non-uniform adsorption of the volatiles on substrate. By contrast, due to fluidization of the food substrate in the process of the present invention, the bed of substrate has a fairly uniform temperature. Thus, volatiles tend to coat and thus adsorb onto the substrate more uniformly and more rapidly in the process of the present invention.

The process of the present invention also tends to be more economical than standard liquid nitrogen processing for volatile recovery. Because of the significantly improved heat dissipation rates, the process of the present invention uses less cryogenic fluid than prior art liquid nitrogen processing for volatile recovery. Also, in the case of coffee aromatization, less coffee as the aroma source needs to be processed to aromatize a given amount of coffee substrate in the process of the present invention. Further, the volatiles can be adsorbed onto the food substrate in sufficient quantities at relatively higher temperatures in the process of the present invention compared to prior art liquid nitrogen processing.

F. Description of the Product

It has been found that the process of the present invention can be used to form aromatized food substrates, especially aromatized coffee substrates having high fidelity aroma. For example, roast and ground coffee, flaked coffee and coffee oil aromatized by the process of the present invention are almost identical in aroma character and intensity to roast and ground coffee and flaked coffee aromatized by direct condensation on a packed column, and coffee oil aromatized by aroma frost. The similarity in aroma character indicates that the chemical constituents required for good aroma character have been transferred to the coffee with minimal thermal degradation of the labile components. The aromatized coffee substrates have been found by gas chromatography to have high aroma intensities, e.g. aroma intensities on the order of about 300,000 to 400,000 G.C. counts.

While it is possible to package the aromatized roast and ground and flaked coffee substrates made according to the process of the present invention as is, it is usually desirable to combine a minor amount, e.g. about 1–20% by weight, of the aromatized substrate with a major amount of non-aromatized, conventionally produced coffee materials. A method for combining the aromatized/non-aromatized blend is to first place the aromatized substrate at the bottom of the container. It is extremely desirable to keep this aromatized substrate below 0° F. in order to insure that the volatiles are not lost unnecessarily. Next, the non-aromatized coffee material is placed on top of the aromatized substrate and the container sealed. The volatiles from the aromatized substrate pass through the non-aromatized coffee materials and equilibrate therewith. On opening the container, the head space above the aromatized/non-aromatized blend develops a pleasant coffee aroma.

In the case of aromatized oil such as coffee oil, the aromatized oil is normally added to an instant (soluble) coffee product. A preferred method is drop-wise addition of the oil to the coffee product. See U.S. Pat. No. 3,769,032 to Lubsen et al, issued Oct. 30, 1972, herein incorporated by reference. The aromatized oil can typically be added to the instant coffee product at amounts of from about 0.05 to 0.8% by weight of the coffee product.

G. G.C. Count Measurement

A suitable technique for measuring actual aroma intensity of aromatized products made according to the process of the present invention is gas chromatography. A flame ionization gas chromatograph analytical instrument measures the total content of organic compounds in a gas head space or void space sample from a packaged product on a scale of relative intensity. The scale is graduated in microvolt-seconds (referred to herein as "G.C. counts") which is a measure of the area under the intensity curve, and the result is reported as an integration of the total area under the curve in total microvolt-seconds ("total counts"). The resulting G.C. count number is a measurement of the concentration of aroma volatiles in the head or void space of the sample.

The chromatograph comprises a 36" chromosorb WAW (acid washed) 60/80 mesh column of ¼" diameter and is housed in an oven section for isothermal temperature control. The column is packed with a uniform-sized solid called the solid support, but is not coated with a non-volatile liquid (called the substrate) because the gas is not to be separated into individual compounds as is commonly done in this type of analysis. A hydrogen flame detector is used at the outlet port. An electrometer receives the output signal from the flame detector and amplifies it into a working input signal for an integration. The integrator both sends a display signal to a recorder to print out the response curve and electronically integrates the area under the curve.

The gas sample is injected into a heated injection port, and is immediately swept into the packed column by a carrier gas flow. The non-separated gas mixture is swept as a compact band through the column and into the detector. The detector then ionizes the sample and generates an electrical signal proportional to the concentration of the materials in the carrier gas. The ionized gases and carrier gas are then vented from the unit.

A Hewlett Packard gas chromatograph (Model 700), electrometer (Model 5771A), integrator (Model 3370A), and recorder (Model 7127D), range 0–5 mv. and temperature controller (Model 220) are used. Nitrogen pressure in the column is approximately 16 psig. Air pressure of 24 psig is used to flush out the detector. An oven temperature of 100° C. is used and maintained to keep the volatiles vaporized. The hydrogen is supplied from a gas cylinder regulated at 30 psig.

Each peak is measured in counts, the counts being first measured by the flame detector and then both integrated and recorded. The number of counts for a particular component is directly proportional to the number of milligrams of that component in the vapor sample.

The recorder is synchronized with the integrator as follows:

1. Calibration

A standard methane gas is used to precisely set the flame ionization response. Prior to analyzing the samples, a 1 cc. sample of gas is obtained from a gas cylinder (0.5% by weight of $CH_4$). The pressure of the gas as it is obtained is 4 psi. The gas sample is syringed into the inlet port of the gas chromatograph. The attenuation of the recorder is set at 8 while the range is 10. The total counts when the procedure is repeated three times average between 145,000 to 150,000 total counts. If the average is not within the specified range, the carrier gas flow rate is adjusted.

2. Sample Analysis

The sample is vacuum packed for at least 3 days at 75°±5° F. before sampling. The amount of coffee packed and the pressure within the canister is evaluated to insure that the sample will give a representative measurement. The vacuum-sealed canister of coffee is punctured to remove the vacuum, then resealed and allowed to equilibrate at least one hour at 75°±5° F. to allow vapor phase equilibration.

After equilibration, a 1 cc. sample of the aromatic atmosphere of the canister headspace/voidspace is taken again using the same type of syringe as used for the standard methane sample. The gas sample is then injected into the inlet port of the gas chromatograph.

For roast and ground and flaked coffee products, the sample is normally taken from a 13 oz. or 16 oz. size can packed under normal coffee packing conditions. However, differences in the can size or the amount of coffee packed do not generally create significant differences in G.C. count measurements unless the can is grossly underfilled.

BEST MODE

The following examples are intended to exemplify the present invention and are not limiting thereof:

EXAMPLE 1

Sixty lbs. of flaked coffee having the following particle size distribution was added to a 10 $ft^3$ capacity paddle mixer (3 ft. in length with 1.8 ft. diameter impeller):

| % Retained on Screen | Screen Size (U.S. Mesh No.) |
|---|---|
| 4 | +12 |
| 16 | +16 |
| 23 | +20 |
| 16 | +30 |
| 41 | Pan |

Approximately 80 lbs. of liquid nitrogen was slowly added to the coffee. The resultant mixture was agitated at 188 ft./min. tip speed to reach an equilibrium bed temperature of −235° F. Additional cooling was provided by forcing liquid nitrogen through the mixer jacket from a supply tank operating at 20 psig.

Grinder gases were generated by grinding a commercial coffee blend roasted to a color of 68–78 photovolts (see Sivetz, Ibid, Vol. II, at pp. 132–138 for measuring the color of coffee by photoelectric devices) in a Model 66 Gump grinder. The grinder was equipped with grinder gas take-off ports mounted beneath the grinder rolls and on the normalizer. The coffee blend was ground at a rate of 636 lbs./hr. to a fine grind particle size distribution. Grinder gas was drawn off at a rate of 9.1 $ft.^3$/min. via a compressor operating at about 1 psig discharge pressure. The grinder gas was passed through the rapidly agitated (approx. 402 ft./min. tip speed) bed of particulated flaked coffee. Under static non-expanded conditions, the coffee bed filled about 20% of the total volume of the mixer. Under agitation, the bed of coffee expanded to the total mixer volume, yielding a bed porosity of about 0.91. Grinder gas was drawn through the expanded coffee bed at a gas loading (flow) rate of 273 $ft.^3$/hr. per $ft.^3$ of coffee. The gas entered below the impeller at one end of the mixer and was drawn out the other end at the top of the mixer. Under these conditions, coffee bed temperatures ranged from −151 to −173° F. during the 4¼ hours of the aromatization run. The intensity of aroma measured in the gas stream averaged 21,400 G.C. counts/cc. for the grinder gas feed into the mixer and 1700 G.C. counts/cc. on exiting the mixer, thus indicating that 92% of the volatiles were recovered.

At the completion of the aromatization run, approximately 2,640 lbs. of coffee had been ground to aromatize the flaked coffee. The aromatized coffee was removed from the mixer and stored at −80° F. in bulk containers. The aromatized coffee was held for 5 days at −80° F. to separate residual carbon dioxide. The intensity of the aromatized coffee was determined by first blending about 10% of the aromatized flaked coffee with 90% non-aromatized flaked coffee and then sealing the blend in a 1 lb. can under vacuum. After allowing the blend to equilibrate for at least 12 hours, the aroma headspace intensity was measured by gas chromatography. The intensity of the 10% aromatized/90% non-aromatized flaked coffee blend was found to be 49,980 G.C. counts/cc. The intensity of the aromatized flaked coffee was determined to be 384,100 G.C. counts/cc.

EXAMPLE 2

Expelled and filtered coffee oil, having a total solid content of less than 1% by weight, was cryofied in a liquid nitrogen slurry. Oil was metered batchwise into a liquid nitrogen filled tank agitated by a 6 inch diameter, high dispersion mixer. About a 2:1 by weight ratio of liquid nitrogen/oil was present at the start of cryofication. After addition of the oil, the liquid nitrogen/oil mixture was continuously agitated at about 900 ft./min. tip speed for 5 minutes. A total of 450 lbs. of particulated cryofied oil was formed in three 150 lbs. batches. A representative particle size distribution was as follows:

| % Retention | Screen Size (U.S. Mesh No.) |
|---|---|
| 5 | +6 |
| 8 | +8 |
| 12 | +12 |
| 19 | +20 |
| 30 | +30 |
| 61 | +50 |

Oil temperature was −320° F. due to the presence of residual liquid nitrogen. Physically, the oil existed as discrete particles having a "puffed" appearance.

Four hundred and fifty lbs. of cryofied oil was added to a chilled 30 $ft.^3$ paddle mixer (4 ft. in length with a 2.8 ft. diameter impeller). Liquid nitrogen at 15 psig pressure was force circulated through the jacket at about 80 gal./min. flow rate. The cryofied oil was continuously agitated at 828 ft./min. tip speed to flash residual liquid nitrogen. An equilibrium bed temperature of −303° F. was reached after two hours of agitation.

Grinder gases were generated by grinding a commercial coffee blend roasted to a color of 77–79 photovolts in a Model 88 Gump grinder. Grinder gas was drawn from 6–10 grinders equipped with grinder gas take-off ports mounted beneath the grinder rolls and on the normalizer. The coffee blend was ground at a nominal rate of 2900 lbs./hr. to an electric perk particle size distribution. Grinder gas was drawn off at the rate of 10–12 $ft.^3$/min. from the grinders via a compressor operating at about 2 psig discharge pressure.

The cumulative grinder gas, which was drawn at a flowrate averaging 98 $ft.^3$/min. from each grinder, was cooled to 75° F. via a gaseous nitrogen chilled tube and shell heat exchanger. The cooled grinder gas stream was passed through the rapidly agitated (approx. 940 ft./min. tip speed) bed of particulated cryofied coffee oil. The oil bed temperature ranged from −307° F. to −209° F. (average of −247° F.) during the 17 hours of the aromatization run. The amount of aroma measured in the gas stream averaged 26,400 G.C. counts/cc. for the grinder gas feed into the mixer and 1900 G.C. counts/cc. on exiting from the mixer, thus indicating 93% of the volatiles were recovered.

The 450 lbs. of cryofied oil occupied approximately 30% of the mixer volume. Under the agitation and gas loading conditions described above, the bed porosity at the beginning of the aromatization run increased to 0.73 (expanded) relative to 0.11 under static (nonexpanded) conditions.

Due to condensation of $CO_2$ and $H_2O$, as well as aroma volatiles, the batch weight in the mixer increased to 793 lbs. at the end of the aromatization run.

At the completion of the run, approximately 62,700 $ft.^3$ of grinder gas was processed. This gas was collected from about 384,000 lbs. of ground coffee. The aromatized oil was removed from the mixer and stored at −80° F. in 14 $ft.^3$ rectangular equilibration cells. The aromatized oil was held for 7 days at −80° F. to separate residual $CO_2$ and to allow further aroma enrichment of oil. Following completion of equilibration, the residual oil was heated gently with an electrically heated perforated plate. The melted oil was batch centrifuged in a lab unit at 3200 rpm for 30 minutes to separate water from the oil. Approximately 385 lbs. of refined oil and 52 lbs. of oil/$H_2O$ sludge were obtained, indicating an overall aromatized oil yield of 86%.

The intensity of the aromatized oil was determined by placing one gram of oil in a 125 ml. glass septum bottle. The bottle was sealed with a rubber stopper and allowed to equilibrate at ambient temperatures for at least one hour, prior to measurement of the aroma headspace intensity by gas chromatography. The intensity of the aromatized oil was found to be 361,800 G.C. counts/cc.

Approximately 0.11 grams of the aromatized oil was added drop-wise to 56 grams of soluble instant coffee in a 2-ounce jar. The jar was then sealed with a glasine liner. The instant coffee/aromatized oil mixture was allowed to equilibrate for at least 12 hours at ambient temperatures prior to gas chromatographic analysis. The headspace aroma intensity averaged 80,000 G.C. counts/cc. and yielded good fidelity coffee aroma upon opening as determined by expert panelists.

EXAMPLE 3

An atlernative residual $CO_2$ separation technique involving pressure fixation of aroma volatiles onto the substrate was evaluated. The aromatized oil prepared in Example 2 was placed in a 2-liter batch pressure bomb. The initial $CO_2$ content of the oil was estimated at about 40%-50%. The bomb was sealed and placed in an agitated hot water bath. The pressure in the bomb was permitted to build up to 205 psig over an hour time period. The bomb was then slowly vented to atmospheric pressure at the rate of 0.25 ft.$^3$/min. for an additional one-hour time period. The bomb was then opened and the contents sealed in containers with gasketed tight-fitting lids.

The aroma intensity of a one gram oil sample in a 125 ml. septum bottle was determined by gas chromatography to be 322,600 G.C. counts/cc. The drop-wise addition of 0.13 grams of this oil to 56 grams of soluble instant coffee yielded a 2-ounce jar headspace intensity of 84,500 G.C. counts/cc. The jar aroma was recognized as being good fidelity coffee aroma by expert panelists.

EXAMPLE 4

The aroma volatile profile of aromatized coffee oil prepared in Example 2 (Direct), and coffee oil aromatized via the addition of aroma frost (Frost) were determined by gas chromatography and compared.

The Frost oil was prepared as follows: A commercial blend of roasted coffee (77-79 photovolts) was ground in a Model 88 Gump grinder equipped with take-off ports below each side port and the normalizer. Grinder gas was pulled by a vacuum from the grinder at a rate of 7-9 ft.$^3$/min. The nominal grinding rate was 3800 lbs./hr. (average across all grinds ranging from drip to electric perk grind size). The nominal physical aroma intensity of the grinder gas stream averaged 35,000 to 40,000 G.C. counts/cc. across all grind sizes. The grinder gas stream was condensed in a liquid nitrogen cooled 9 ft.$^2$ scraped-wall heat exchanger at the rate of about 10 lbs./hr. (9 ft.$^3$/min. gas loading rate and −320° F. condensing temperature).

Clarified coffee oil (less than 1% solids content) was chilled to −320° F. by the addition of about a 3:1 by weight ratio of liquid nitrogen to coffee oil in a high shear mixer. The resultant frozen mixture was rapidly mixed to yield a finely particulated cryofied oil. Sixty lbs. of this cryofied oil was added to 240 lbs. of condensed aroma frost from the scraped-wall heat exchanger and thoroughly mixed in a paddle mixer. The resultant mixture was transferred to 14 ft.$^3$ rectangular equilibration cells and stored for 6 days at −80° F. Following the melting/centrifugation procedure described in Example 2, residual $CO_2$ and water were evaporated from the aroma enriched coffee oil.

Approximately 0.11 g. of the Direct oil and 0.12 g. of the Frost oil were added dropwise to 56 g. of soluble coffee in a 2 oz. jar. The jar was then sealed with a glasine liner. The soluble coffee/oil mixtures were allowed to equilibrate for at least 12 hours at ambient temperatures prior to gas chromatographic analysis. The headspace aroma intensities averaged about 80,000 G.C. counts/cc. for both Direct oil and Frost oil.

To determine the volatile profile for Direct oil and Frost oil, a Perkin-Elmer Model 990 gas chromatograph equipped with temperature programming, flame ionization detector and Varian Integrator Model CDS 111 was used. A 60 ft. long, 0.03 inch diameter glass capillary column coated with a thin layer of Carbowax 20[R] and heated in an oven in which the temperature can be controlled and increased according to a specified pattern by the temperature programmer was employed. The hydrogen flame ionization detector was attached to the outlet port of the column. The signal generated by the detector was amplified by an electrometer into a working input signal for the integrator. The integrator sent a display signal to a recorder to print out the response curve and to electronically integrate the area under the curve.

The sample preparation and experimental conditions for measuring the aroma volatiles of the aromatized coffee oil products were as follows: Ten grams of coffee oil were taken out and put into a 125 ml. glass vial covered by a Mininert valve, manufactured by Pierce Chemical Company of Rockford, Illinois. The vial was held at ambient temperature (72° F.) for at least an hour to reach equilibrium. One hundred microliters of headspace aroma were taken from the vial by a gas-tight syringe and injected into the sample port of the gas chromatograph by an automatic plunger. Inside the sample port, the aroma volatiles were condensed onto a small cold trap chilled by liquid nitrogen to −135° C. (−211° F.). After all the aroma volatile components condensed, the trap was quickly warmed up to 300° C. and swept by a nitrogen carrier gas to push the aroma volatiles into the column. The column was held at a temperature of 80° C. (176° F.) for 4 minutes and was then heated up to 135° C. (572° F.) at a rate of 4° C. (39° F.)/min. Flow rate of the nitrogen carrier gas was 6 ml./min.

The results from the chromatograph, i.e. peak number, time (in minutes) at which the volatile component was recorded, and the percentage of the total area under the gas chromatograph curve which the peak represented, were recorded as follows:

| | DIRECT | | FROST | | Difference in Area | |
|---|---|---|---|---|---|---|
| Peak (#) | Time (min.) | Area (%) | Time (min.) | Area (%) | (%) | *Comments |
| 1 | 0.68 | 0.06 | | | | Air Peak (NS) |
| 2 | 0.73 | 0.03 | | | | Air Peak (NS) |
| 3 | 1.70 | .075 | 1.73 | 0.46 | 0.46 | Increase |
| 4 | 1.74 | 4.04 | 1.77 | 3.22 | 0.82 | Increase |
| 5 | 1.78 | 14.87 | 1.81 | 11.24 | 3.63 | Increase |
| 6 | 1.83 | 4.93 | 1.85 | 6.57 | −1.64 | Decrease |
| 7 | 1.85 | 10.78 | 1.88 | 11.41 | −0.63 | Decrease |
| 8 | 1.90 | 34.43 | 1.93 | 35.90 | −1.47 | Decrease |
| 9 | 1.95 | 7.32 | 1.98 | 7.62 | −0.30 | Decrease |
| 10 | 1.99 | 0.79 | 2.02 | 0.95 | −0.16 | Decrease |
| 11 | — | — | 2.07 | 1.92 | 1.21 (11 and 12) | Combined |
| 12 | 2.07 | 15.65 | 2.11 | 14.94 | | |
| 13 | 2.19 | 0.01 | — | — | 0.01 | No change |
| 14 | 2.23 | 3.49 | 2.27 | 3.21 | 0.28 | Increase |
| 15 | 2.34 | 0.32 | 2.38 | 0.32 | 0 | No Change |
| 16 | 2.42 | 0.07 | 2.46 | 0.05 | 0.02 | No Change (NS) |
| 17 | 2.46 | 0.06 | 2.50 | 0.06 | 0 | No Change |
| 18 | 2.56 | 2.05 | 2.60 | 1.88 | 0.17 | Increase |
| 19 | 2.81 | 0.02 | 2.86 | 0.02 | 0 | No Change |
| 20 | 2.99 | 0.01 | 3.04 | 0.01 | 0 | No Change |
| 21 | 3.05 | 0.05 | 3.10 | 0.04 | 0.01 | No Change |
| 22 | 3.11 | 0.02 | 3.15 | 0.01 | 0.01 | No Change |
| 23 | 3.33 | 0.02 | — | — | 0.02 | No Change (NS) |
| 24 | 4.70 | 0.02 | — | — | 0.02 | No Change (NS) |
| 25 | 4.83 | 0.12 | 4.80 | 0.11 | 0.01 | No Change |
| 26 | 5.03 | 0.01 | 4.97 | 0.01 | 0 | No Change |
| 27 | 6.13 | 0.01 | 6.05 | 0.02 | −0.01 | No Change |
| 28 | 6.21 | 0.03 | — | — | 0.03 | No Change (NS) |
| 29 | 8.13 | 0.02 | — | — | 0.02 | No Change |

-continued

| | DIRECT | | FROST | | Difference in Area | |
|---|---|---|---|---|---|---|
| Peak (#) | Time (min.) | Area (%) | Time (min.) | Area (%) | (%) | *Comments |
| | | | | | | (NS) |
| 30 | — | — | 9.09 | 0.01 | −0.01 | No Change (NS) |
| 31 | 10.61 | 0.02 | — | — | 0.02 | No Change (NS) |

*NS = No significant difference

Peaks which were recorded at approximately the same time for both Direct and Frost aromatized coffee oils are believed to represent the same volatile component. Therefore, the results from Direct and Frost coffee oil have been lined up accordingly. Peak-by-peak comparison shows that the general features are the same; however, there are slight differences in relative amounts of some components. These differences appear in the most volatile components having retention times less than 2 minutes. There are also some extra peaks in the Direct aromatized coffee oil after 2 minutes retention time. However, the magnitude of these peaks, less than $2\times10^{-10}$ grams in all cases, is below the effective sensitivity of the gas chromatograph detector. Therefore, it cannot be concluded that these are real differences in the components due to the exceedingly low amounts detected. Thus, it can be seen that the Direct volatile profile is virtually identical to that of the Frost profile, indicating capture and retention of the keg volatile components.

EXAMPLE 5

The effect of tip speed, gas loading and amount of food substrate on bed temperature and heat transfer characteristics of a mechanically fluidized system was tested as follows: Various amounts of drip grind particle-size roast and ground coffee were added to a 10 ft.$^3$ capacity chilled paddle mixer (see Example 1). The tip speed of the mixer was adjusted to achieve an expanded, mechanically fluidized bed of coffee. The tip speed was progressively increased with the degree of bed expansion limited by the vessel geometry and initial fill level of the coffee. The mixer was chilled by forcing liquid nitrogen through the jacket thereof from a supply tank operated at 15–20 psig. Air containing approximately 1% moisture by volume at ambient temperature was forced at various flow rates through the beds of coffee to approximate 80% of the heat of condensation/adsorption of a grinder gas feedstock. For a given fill volume of coffee, tip speed and gas loading rate, sufficient time was allowed until steady state bed temperatures were reached.

The results of the above test are presented in the following table:

| Run No. | Substrate Batch Size (lbs.) | Tip Speed of Mixer (ft./min.) | Gas Loading Rate (ft.$^3$/hr./ft.$^3$) | Bed Condition |
|---|---|---|---|---|
| 1 | 60 | 157 | 90 | Not expanded |
| 2 | 60 | 439 | 90 | Expanded |
| 3 | 60 | 251 | 444 | Expanded |
| 4 | 60 | 502 | 444 | Expanded |
| 5 | 60 | 690 | 444 | Expanded |
| 6 | 130 | 157 | 42 | Not expanded |
| 7 | 130 | 251 | 42 | Expanded |
| 8 | 130 | 465 | 42 | Expanded |
| 9 | 130 | 213 | 196 | Expanded |
| 10 | 130 | 408 | 196 | Expanded |

-continued

| Run No. | Substrate Batch Size (lbs.) | Tip Speed of Mixer (ft./min.) | Gas Loading Rate (ft.$^3$/hr./ft.$^3$) | Bed Condition |
|---|---|---|---|---|
| 11 | 130 | 690 | 196 | Expanded |
| 12 | 180 | 314 | 483 | Not expanded |
| 13 | 180 | 439 | 483 | Expanded |
| 14 | 180 | 628 | 483 | Expanded |
| 15 | 180 | 753 | 483 | Expanded |
| 16 | 300 | 188 | 18 | Not expanded |
| 17 | 300 | 377 | 54 | Not expanded |

| Run No. | Bed Porosity | Bed Temperature (°F.) | Increase in Overall Heat Transfer (%) |
|---|---|---|---|
| 1 | 0.55 | −50 | Base |
| 2 | 0.91 | −150 | 110 |
| 3 | 0.91 | −122 | 230 |
| 4 | 0.91 | −140 | 288 |
| 5 | 0.91 | −147 | 437 |
| 6 | 0.55 | −100 | 51 |
| 7 | 0.81 | −160 | 190 |
| 9 | 0.81 | −126 | 219 |
| 10 | 0.81 | −138 | 315 |
| 11 | 0.81 | −143 | 407 |
| 12 | 0.55 | −87 | 472 |
| 13 | 0.74 | −107 | 630 |
| 14 | 0.74 | −116 | 802 |
| 15 | 0.74 | −116 | 847 |
| 16 | 0.55 | 28 | 41 |
| 17 | 0.55 | 23 | 152 |

As can be seen from the above table, for fill volumes up to about 60% of total vessel capacity, bed expansion was achieved with tip speeds exceeding 157 to 314 ft/min. Below this point mechanical fluidization was not obtainable. In the non-expanded beds, the bed temperature ranged from 23° F. to −100° F. For conditions typical of a mixer system having high fill volumes of coffee/low tip speeds, bed temperatures of only 23° to 28° F. were achieved. These temperature ranges are not sufficiently cold enough for effective grinder gas volatile recovery. For tip speeds sufficient to achieve bed porosities of from 0.74 to 0.91 (fluidized beds), bed temperatures ranged from −100° to −160° F. Optimum bed temperatures were achieved with coffee fill volumes of up to 40% of the vessel capacity with tip speeds in the range of 408 to 690 ft./min. and high gas loading (flow) rates. Further reduction of bed temperature below those indicated in the above table are possible by forced liquid nitrogen circulation through the mixer jacket and by great heat transfer surface area to substrate volume ratios.

EXAMPLE 6

The quantity of coffee processed to aromatize flaked coffee products by three alternative recovery techniques was compared. These three methods were frost aromatization, direct condensation on a packed column and the process of the present invention.

For frost aromatization, grinder gas was pulled via a vacuum from a commercial blend of coffee roasted to 77–79 photovolts at a rate of 7 ft.$^3$/min. from a Model 88 Gump grinder equipped with take-off ports below each side port and the normalizer. The nominal grinding rate was 3800 lbs./hr. (average across all grinds ranging from drip to electric perk grind size). The nominal intensity of the grinder gas stream averaged 39,700 G.C.

counts/cc. across all grind sizes. The grinder gas was condensed in a liquid nitrogen cooled DeLaval 9 $ft.^2$ scraped-wall heat exchanger at the rate of about 10 lbs./hr. (9 $ft.^3$/min. gas loading rate and −320° F. condensing temperature). Flaked coffee was chilled to about −200° F. by the addition of a 0.5:1 by weight ratio of liquid nitrogen to coffee. Twenty-five lbs. of condensed aroma frost from the scraped-wall heat exchanger was added to 75 lbs. of flaked coffee and thoroughly mixed. The resultant mixture was stored in dry ice to slowly sublime the carbon dioxide and to allow volatile absorption by the flaked coffee. The mixture was held for six days at an average temperature of −75° F. The intensity of the aromatized flaked coffee was determined to be 646,200 G.C. counts.

For direct condensation on a packed column, 19 lbs. of flaked coffee were added to a stainless steel adsorption column 4 ft. long and 6 in. in diameter. The column was immersed in a bath of liquid nitrogen which cooled the top of the column to −30° F., the middle of the column to −287° F. and the base of the column to −301° F. Grinder gases were generated from a commercial coffee blend roasted to a color of 78 photovolts ground in a Model 66 Gump grinder. The grinder was equipped with grinder gas take-off ports mounted beneath the grinder rolls and on the normalizer. The roasted coffee was ground at a rate of 780 lbs./hr. The grinder gas was drawn off at a rate of 2.2 $ft.^3$/min. by a vacuum pump. The grinder gas was drawn through the absorption column where the aroma volatiles were adsorbed onto the cold, flaked coffee. During the adsorption run, the temperatures averaged −171° F. throughout the entire column with a range of −30° to +25° F. at the top of the column, −287° to −170° F. at the center of the column, and −301° to −288° F. at the base of the column. At the completion of a 2 hour aromatization run, approximately 1750 lbs. of roasted coffee had been ground to aromatize the flaked coffee in the column. Following equilibration for 4 days at −80° F., the aromatized flaked coffee was determined to have an aroma intensity of 484,200 G.C. counts.

For the process of the present invention, 60 lbs. of flaked coffee, see Example 1, was aromatized in a mechanically fluidized system. About 2640 lbs. of coffee was ground to yield an aromatized flaked coffee having an intensity of 384,100 G.C. counts.

The results from the foregoing three aromatization methods are presented in the following table:

| Method | Batch size (Lbs.) | Condensation Temp.(°F.) | Aroma gas processed ($ft.^3$/lb.) | Amount of roast & ground processed (lbs.) |
|---|---|---|---|---|
| Frost Aromatization | 100 (25% frost/ 75% chilled coffee) | −320 | 55.8 | 12,670 |
| Direct condensation on packed column | 19 | −171 | 12.1 | 1,750 |
| Process of present invention | 60 | −166 | 37.8 | 2,640 |

| Method | [1]Aromatized substrate intensity (G.C. counts) | [2]Aromatized substrate addition level (%) | [3]Amount of aromatized coffee produced (lbs.) | [4]Stoichometry (lbs. of R&G processed per lbs. aromatized coffee |
|---|---|---|---|---|
| Frost Aromatization | 646,200 | 7.2 | 1042 | 12.2 |
| Direct condensation on packed column | 484,200 | 9.6 | 198 | 11.3 |
| Process of present invention | 384,100 | 12.2 | 490 | 4.6 |

[1]Measured from 10% by weight addition of aromatized flaked coffee substrate to 90% by weight non-aromatized flaked coffee (see Example 1).
[2]Calculated on basis of linear addition of aromatized flaked coffee substrate necessary to raise flaked coffee having an aroma intensity of 15,000 G.C. counts to 60,000 G.C. counts.
[3]Calculated from batch size weight fraction of aromatized flaked coffee substrate required to raise aroma intensity from 15,000 to 60,000 G.C. counts
[4]Amount of R&G coffee required to form aromatized flaked coffee product of 60,000 G.C. counts.

As shown in the above table, the amount of processed roast and ground coffee needed to form aromatized flaked coffee products of similar intensity greatly differs in these three methods. In the case of condensed aroma frost and direct condensation on a packed column, about 12.2 and 11.3 lbs. of processed roast and ground coffee, respectively, was needed to increase the aroma intensity of 1 lb. of flaked coffee from 15,000 to 60,000 G.C. counts. By contrast, only 4.6 lbs. of processed roast and ground coffee was needed in the process of the present invention.

What is claimed is:

1. A method for aromatizing a food substrate, comprising the steps of:
   placing a particulate solid food substrate in a vessel;
   cooling the vessel with a cryogenic fluid;
   mechanically fluidizing the food substrate by mixing at a tip speed of at least about 200 ft./min., to provide an absorbent bed thereof having a porosity of at least about 0.73; and
   contacting the fluidized, cooled bed of food substrate at a temperature below about −100° F. with gaseous food volatiles at a rate of at least about 42 $ft.^3$/hr. per $ft.^3$ of food substrate, whereby the food volatiles condense on and are adsorbed by the food substrate.

2. A method according to claim 1 wherein the fluidized bed of food substrate has a porosity of at least about 0.81.

3. A method according to claim 1 wherein the tip speed is from about 400 to 1000 ft./min. and wherein the volatiles are flowing at a rate of from about 500 to 2000 $ft.^3$/hr. per $ft.^3$ of food substrate.

4. A method according to claim 1 wherein the temperature during said contacting step is below about −150° F.

5. A method according to claim 4 further comprising the step of cryofying the food substrate prior to said cooling and fluidization steps.

6. A method according to claim 4 further comprising the step of equilibrating the aromatized food substrate after said contacting step.

7. A method according to claim 6 further comprising the step of adding unaromatized food substrate after said contacting step and prior to said equilibration step.

8. A method according to claim 1 wherein the food substrate comprises a coffee substrate.

9. A method according to claim 1 wherein the cryogenic fluid is liquid nitrogen.

10. A method for aromatizing a coffee substrate, comprising the steps of:

placing a particulate solid coffee substrate in a vessel;

cooling the vessel with a cryogenic fluid;

mechanically fluidizing the coffee substrate by mixing at a tip speed of at least about 200 ft./min. to provide an absorbent bed thereof having a porosity of at least about 0.73; and contacting the fluidized, cooled bed of coffee substrate at a temperature below about −150° F. with gaseous coffee volatiles at a rate of at least about 42 $ft.^3$/hr. per $ft.^3$ of coffee substrate, whereby the coffee volatiles condense on and are adsorbed by the coffee substrate.

11. A method according to claim 10 wherein the coffee substrate is selected from the group consisting of roast and ground coffee, flaked coffee and mixtures thereof.

12. A method according to claim 10 wherein the coffee substrate comprises an edible oil.

13. A method according to claim 12 further comprising the step of cryofying the edible oil prior to said cooling and fluidization steps.

14. A method according to claim 13 wherein the edible oil is coffee oil.

15. A method according to claims 10, 11, 12, 13 or 14 wherein the volatiles comprise grinder gas.

16. A method according to claim 10 further comprising the step of adding unaromatized coffee substrate after said contacting step.

17. A method according to claim 10 further comprising the step of cryofying the coffee substrate prior to said cooling and fluidization steps.

18. A method according to claim 10 wherein the cryogenic fluid is liquid nitrogen.

19. A method according to claim 10 wherein the coffee substrate is soluble coffee.

* * * * *

UNITED STATES PATENT AND TRADEMARK OFFICE
CERTIFICATE OF CORRECTION

PATENT NO. : 4,335,149

DATED : June 15, 1982

INVENTOR(S) : Gordon K. Stipp

It is certified that error appears in the above-identified patent and that said Letters Patent are hereby corrected as shown below:

Col. 14, line 66, "atlernative" should read -- alternative -- .

Col. 16, in the Table, the line reading:

"3 1.70 .075 1.73 0.46" should read:

-- 3 1.70 0.75 1.73 0.46 -- .

Signed and Sealed this

***Twenty-fourth* Day of *August 1982***

[SEAL]

*Attest:*

GERALD J. MOSSINGHOFF

*Attesting Officer* *Commissioner of Patents and Trademarks*